Figure 1:
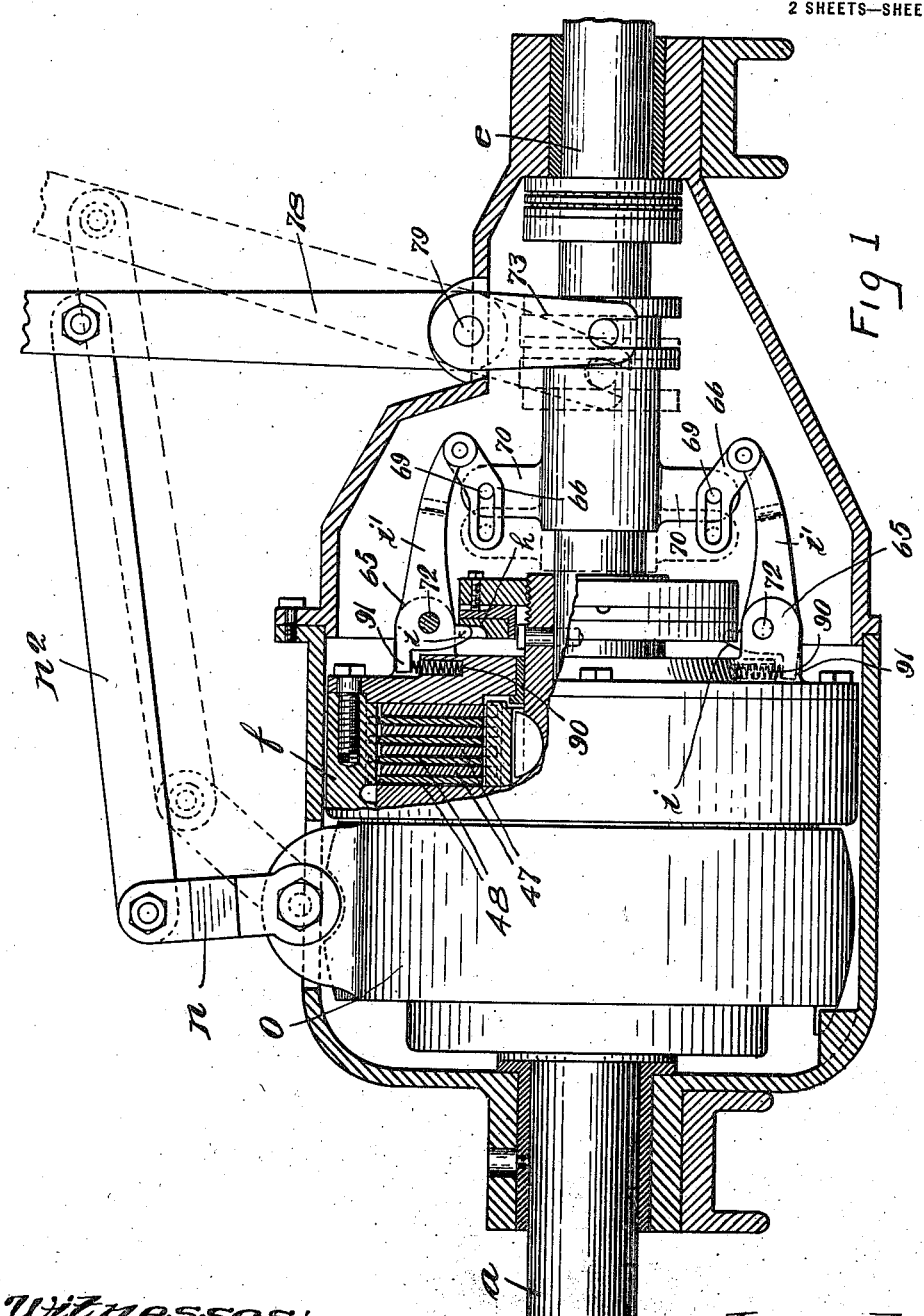

H. A. TUTTLE.
CLUTCH MECHANISM FOR REVERSING GEARING.
APPLICATION FILED FEB. 18, 1915.

1,168,688.

Patented Jan. 18, 1916.
2 SHEETS—SHEET 2.

Witnesses:
H. B. Davis.
R. Connell.

Inventor:
Henry A. Tuttle.
by Ames & Harriman
Attys

UNITED STATES PATENT OFFICE.

HENRY A. TUTTLE, OF TAUNTON, MASSACHUSETTS, ASSIGNOR TO EVANS STAMPING AND PLATING COMPANY, OF TAUNTON, MASSACHUSETTS, A CORPORATION OF MASSACHUSETTS.

CLUTCH MECHANISM FOR REVERSING-GEARING.

1,168,688. Specification of Letters Patent. Patented Jan. 18, 1916.

Application filed February 18, 1915. Serial No. 9,141.

*To all whom it may concern:*

Be it known that I, HENRY A. TUTTLE, a citizen of the United States, residing at Taunton, in the county of Bristol and State of Massachusetts, have invented an improvement in Clutch Mechanism for Reversing-Gearing, of which the following is a specification.

In another application, #9,139, filed Feb. 18, 1915, I have shown an improved form of operating-means for clutches involving essentially a plurality of pivoted levers for moving the clutch-operating member, and a sliding sleeve, as contrasted with a sliding-cone, for operating said levers. These pivoted levers have toes or projections at one end for engaging the clutch-operating member, and have links at their other end for loose connection with the sliding-sleeve. Sliding movement of the sleeve is accomplished by means of a shifting-lever, but for some purposes, said shifting-lever is employed for moving other elements, as for instance, when the clutch is associated with reversing-gearing, said lever is employed for moving the brake-mechanism for reverse drive, and in such case, an independent movement of the shifting-lever is required.

In the present form of clutch-operating means, the links connecting the pivoted levers with the sliding-sleeve have elongated slots, and said links are arranged for relative movement with respect to the levers and sleeve so that the pins connecting the links with the sleeve may move freely in said slots, thus to provide for independent movement of the shifting-lever. In certain positions of the parts, the tendency is for the free ends of the levers to which the links are connected to move outward or to fly outward by centrifugal action, and in such case the links will be moved by them and as a result the clutch-operating means will be moved slightly, or at least sufficient to cause the clutch-plates to chafe or grind, which is very objectionable.

The present invention has for its object the provision of means associated with said pivoted levers, arranged to hold said levers yieldingly against outward movement, except when positively moved by a movement of the sliding sleeve. In the embodiment of the invention, as here shown for illustration, such means consists of pressure-springs arranged to apply a pressure or force to said levers to hold them against outward movement, which, however, admits of an outward movement of said levers by a positive action of the links and sliding sleeve. These springs may be interposed between the levers and the hub of the clutch-operating member.

Figure 2:
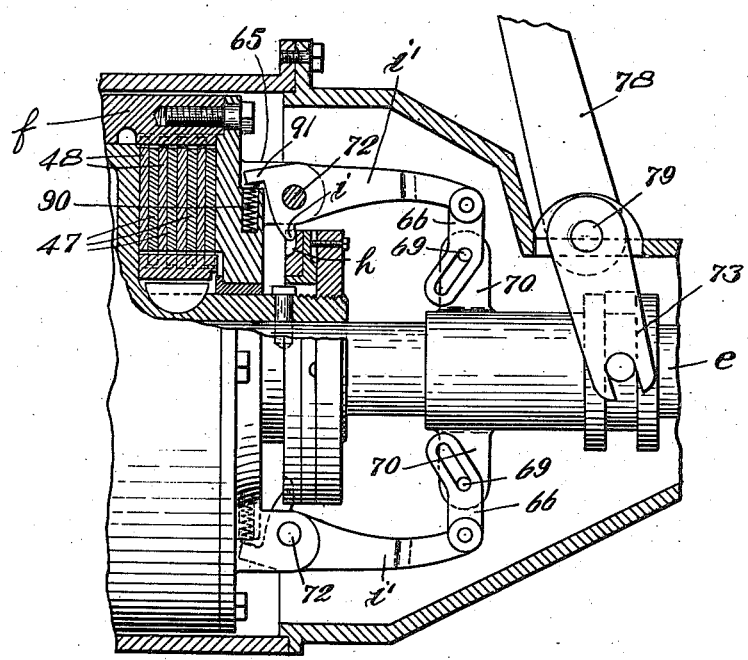
Figure 3:
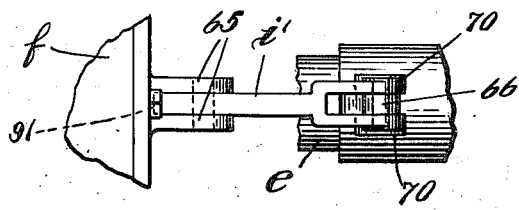

Figure 1, is a side-elevation of a reversing-gearing having clutch-operating means embodying this invention, said means being represented in a position in which there is a tendency for the levers to be thrown outward by centrifugal action. Figs. 2 and 3, are detail views of the clutch-operating means.

The reversing-gearing with which the clutch is here associated for illustration is substantially the same as shown in my application #629,596, it having an axially movable clutch-operating member $f$, represented as the pinion-carrier, axial movement of which forces the clutch-plates 47, 48, into engagement with each other for setting the clutch to connect the driven-shaft $e$ with the driving-shaft $a$ for forward drive or rotation in the same direction as the driving-shaft; and $o$ is the brake-band of a brake-mechanism by which reverse-drive of the driven-shaft $e$ is obtained.

78 designates the shifting-lever for the clutch and brake-mechanism, it being pivoted at 79, and connected by a link $n^2$, with the rocking-member $n$ of the brake-band $o$, and having a yoke 73 for engagement with the sliding-sleeve on the driven-shaft $e$, which sleeve has ears 70, with lateral pins 69, engaging slotted links, which links are pivotally connected to the free ends of levers $i'$, pivotally connected at 72, to ears 65 on the outer side of the clutch-operating member $f$, said levers having toes $i$ for engagement with an abutment $h$, fixed to a member on a driven-shaft and rotatable therewith. The shifting-lever is designed for movement into three positions.

In its middle, neutral, or normal position, both the clutch and brake-mechanism are released, and the links 66 occupy substantially horizontal positions, as represented in Fig. 1. In its forward position, the sliding-sleeve is moved in a forward direction from normal, and the links are moved into vertical positions or thereabout, and the pivoted levers are moved on their pivots to cause axial movement of the clutch-operating member to set the clutch, as represented in Fig. 2. In its rearward position, the sliding-sleeve is moved in a rearward direction from normal, and the pins thereon are moved along the slots of the links, which links during such movement are arranged substantially horizontal, thus to operate the brake-mechanism, as represented by dotted lines Fig. 1. This form of clutch forms the subject matter of my application #9,139, aforesaid, which is a division of my application #629,596. In certain positions of the associated parts the pivoted levers have a tendency to move them outward and to correspondingly move the clutch-operating member and cause the clutch-plates to chafe and grind. To resist such outward movement of the levers $i'$, springs 90 are arranged between extensions 91 on the inner ends of said levers and the hub of the clutch-operating member $f$, which act by pressure and with sufficient force to hold said levers yieldingly against outward movement, although said springs admit of a positive outward movement of said levers caused by the positive operation of the links, sleeve and shifting-lever.

While a particular structure is here shown for carrying out my invention, yet it will be understood that my invention is broader in scope, as hereafter set forth in the claims.

I claim:—

1. A clutch-mechanism for reversing-gearing having an axially movable clutch-operating member, clutch-operating means associated with said member comprising pivoted levers arranged longitudinally of the clutch, slotted links, a sliding-sleeve and a shifting-lever, said parts being connected and arranged to admit of a movement of the shifting-lever and sleeve independently of said levers, and springs arranged to yieldingly hold said levers against outward movement.

2. A clutch-mechanism for reversing-gearing having an axially movable clutch-operating member, clutch-operating means associated with said member comprising pivoted levers arranged longitudinally of the clutch, links having elongated slots, a sliding-sleeve having pins arranged in said slots and a shifting-lever associated with said sleeve, and springs interposed between said levers and clutch-operating member for yieldingly holding said levers against outward movement.

In testimony whereof, I have signed my name to this specification, in the presence of two subscribing witnesses.

HENRY A. TUTTLE.

Witnesses:
B. J. NOYES,
H. B. DAVIS.